_United States Patent Office_

2,832,770
Patented Apr. 29, 1958

2,832,770

PREPARATION OF ALPHA-BROMO AND ALPHA-IODO-EPSILON-CAPROLACTAM

Thomas R. Hopkins, Joplin, Mo., William C. Francis, Pittsburg, Kans., and James C. Werner, Joplin, Mo., assignors to Spencer Chemical Company, a corporation of Missouri No Drawing. Application March 30, 1956
Serial No. 574,969

7 Claims. (Cl. 260—239.3)

This invention relates to novel chemical compounds. More particularly, this invention is concerned with the production of novel compounds of the formula

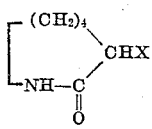

wherein X is bromine or iodine, and novel processes of producing such compounds. These compounds may be named alpha-bromo-epsilon-caprolactam (or 2-keto-3-bromohexamethyleneimine) and alpha-iodo-epsilon-caprolactam (or 2-keto-3-iodo-hexamethyleneimine). They are useful intermediates in a synthesis of lysine.

It has been found that alpha-bromo-epsilon-caprolactam may be conveniently produced by reacting epsilon-caprolactam with a brominating agent under suitable reaction conditions and hydrolyzing the resulting reaction product to the desired compound. This reaction may be represented as follows:

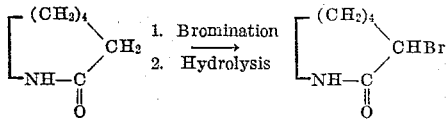

It is surprising to find that this bromination results in a reaction product which upon hydrolysis yields substantial amounts of alpha-bromo-epsilon-caprolactam in preference to alpha,alpha-dibromo-epsilon-caprolactam since chlorination under similar conditions, followed by hydrolysis, results chiefly in the formation of alpha,alpha-dichloro-epsilon-caprolactam. The direct production of alpha-bromo-epsilon-caprolactam is significant since it obviates one step in the production of alpha-halo-epsilon-caprolactams suitable for use in the synthesis of lysine. Previously, it was necessary to subject alpha,alpha-dichloro-epsilon-caprolactam to catalytic hydrogenation, or other chemical means of dehalogenation, to produce alpha-chloro-epsilon-caprolactam.

Some brominating agents which may be employed in the described process are $PBr_5$, $PBr_3$, $PCl_5$ plus $Br_2$, $PBr_3$ plus $Br_2$, $PCl_3$ plus $Br_2$ and appropriate mixtures thereof. Of these, $PBr_5$, or the equivalent combination of $PBr_3$ and $Br_2$, is the preferred brominating agent. Generally, at least two moles of a brominating agent are employed per mole of epsilon-caprolactam; however, a substantial excess may be used if desired.

The reaction is preferably effected under liquid reaction conditions. This may be achieved through the use of an excess of brominating agents which are liquids at the reaction temperatures employed or, and preferably, by the use of inert organic solvents such as xylene, benzene, toluene, chloroform and carbon tetrachloride. Liquid reaction conditions made it possible to control the heat of reaction readily, maintain the reactants in intimate contact and facilitate processing.

Reaction temperatures will vary considerably with the solvents used and the particular brominating agents employed; however, it is generally found that such reaction temperatures fall within the range of 30–120° C. The preferred temperatures are 40–50° C.; by selecting agents and solvents which effect the reaction at such temperatures, high yields of the final products are obtained. $PBr_5$ works very well at these temperatures. It has also been found that increased yields result from contacting epsilon-caprolactam and the brominating agents at initial temperatures below about 30° C. and subsequently raising the temperature of the mixture to effect bromination. It is accordingly advantageous to first bring the reactants together at about 0° C. to 30° C. and to subsequently raise the temperature to effect the bromination.

The time required to complete the reaction will vary, but from 1 to 5 hours is considered adequate under most conditions.

The bromination reaction results in the formation of an intermediate of undetermined composition which is readily converted by hydrolysis to the desired alpha-bromo-epsilon-caprolactam. The brominated mixture may be hydrolyzed directly, but it is preferred to first remove the solvent medium before doing this so that the product will precipitate directly from the hydrolysis mixture. Other conventional recovery procedures may be employed as desired.

Alpha-bromo-epsilon-caprolactam and alpha-chloro-epsilon-caprolactam may be converted to alpha-iodo-epsilon-caprolactam by their reaction with an iodine salt, such as the alkali metal and alkaline earth metal iodides, preferably in a liquid reaction medium. Thus, alpha-bromo-epsilon-caprolactam or alpha-chloro-epsilon-caprolactam may be reacted with an excess of sodium iodide in a suitable solvent such as acetone; the resulting insoluble inorganic salt (e. g., NaBr or NaCl) removed by filtration, and the alpha-iodo-epsilon-caprolactam isolated by removal of solvent, as by distillation under reduced pressure.

Alpha-bromo-epsilon-caprolactam and alpha-iodo-epsilon-caprolactam may be subsequently aminated and hydrolyzed to form lysine following the novel procedures disclosed and claimed in the copending application, Serial No. 524,967, filed March 30, 1956.

The following examples are presented to illustrate specific embodiments of the invention. It should be understood, however, that these examples shall in no way be understood as limiting the invention to these specific procedures.

*Example 1*

A solution of 17 g. (0.15 mole) of epsilon-caprolactam in 50 ml. of benzene was added to a mixture of $Br_2$ (0.3 mole) and $PBr_3$ (0.3 mole) in 50 ml. of benzene which was maintained at 10–15° C. An additional 100 ml. of benzene was added, and the mixture heated to 40–50° C. for a period of 5½ hours. The lower liquid layer was separated and hydrolyzed by addition to cracked ice, and the precipitated product collected by filtration. The filtrate was extracted with chloroform and the solvent removed from the extract by distillation to yield additional product. The combined crops were washed with a little water and dried to yield 19.2 gm. of alpha-bromo-epsilon-caprolactam, M. P. 113–115° C.

*Example 2*

A solution of 48 g. (0.3 mole) of $Br_2$ in 50 ml. of chloroform was added to a stirred solution of 81 g. (0.3 mole) of $PBr_3$ in 50 ml. of chloroform while cooling with an ice bath. A solution of 17 g. (0.15 mole) of epsilon-caprolactam in 50 ml. of chloroform was then slowly added to the cooled mixture. The reaction flask was fitted with a condenser and drying tube, and the mixture was heated to reflux for four hours. The solvent was then removed by distillation under reduced pressure, and the liquid residue slowly added to excess 10% aqueous sodium carbonate solution. The dark oily precipitate which formed was washed with water, dried, and extracted with hot n-hexane. From the cooled hexane extract there precipitated the crude product as light tan-colored crystals; M. P. 110–112° C. This material was decolorized with activated charcoal in hot n-hexane, and recrystallized twice from that solvent to yield 1.3 g. of alpha-bromo-epsilon-caprolactam, M. P. 111–113° C.

*Example 3*

A solution of 48 g. (0.3 mole) of $Br_2$ in 50 ml. of benzene was added to 41 g. (0.15 mole) of $PBr_3$ while cooling at 10–15° C. with an ice bath. To the stirred mixture was added dropwise a solution of 17 g. (0.15 mole) of epsilon-caprolactam in 50 ml. of benzene while maintaining the temperature at 10–15° C. for 45 minutes. An additional 50 ml. of benzene was added, and the reaction mixture was heated at 40–50° C. for 5½ hours under a dry nitrogen atmosphere. On cooling to room temperature, the reaction mixture formed two liquid layers. The lower layer was separated and added to 200 ml. of cracked ice; the hydrolysis product separated as an oil. After standing overnight, the water layer was decanted and the oily residue washed with excess 5% aqueous sodium bicarbonate. After drying, the crude product was dissolved in methanol and decolorized with activated charcoal. Addition of water to the methanol solution precipitated the product which was collected by filtration and dried to yield 19.4 g. of alpha-bromo-epsilon-caprolactam, M. P. 105–109° C.

*Example 4*

The procedure of Example 1 was repeated except that the mixture was heated at 40–50° C. for a period of 3½ hours. The lower liquid layer was separated and hydrolyzed by the addition of cracked ice. The precipitate was collected by filtration, washed and dried. The combined filtrate and washings were extracted with chloroform and the solvent removed from the chloroform layer by distillation. The crystalline residue was washed with a small amount of water and dried. The total yield of crystalline alpha-bromo-epsilon-caprolactam was 18.8 g., M. P. 112–114° C.

*Example 5*

A stainless steel autoclave, charged with 5.8 g. (0.03 mole) of alpha-bromo-epsilon-caprolactam, 6.7 g. (0.045 mole) of sodium iodide and 100 ml. of dry acetone, was heated on a steam bath for 22 hours. The solid by-product, sodium bromide, was removed by filtration and the acetone solution distilled to dryness. The residue was stirred with approximately 200 ml. of an aqueous sodium carbonate solution, allowed to stand for 1–2 days, and the crude product removed by filtration. Recrystallization from a benzene-petroleum ether mixture yielded 2.3 g. of cream-colored crystals of alpha-iodo-epsilon-caprolactam, M. P. 127–128° C.

Various changes and modifications of the invention can be made and, to the extent that such variations incorporate the spirit of this invention, they are intended to be included within the scope of the appended claims.

What is claimed is:

1. The process which comprises reacting epsilon-caprolactam with a brominating agent and hydrolyzing the resulting product to produce alpha-bromo-epsilon-caprolactam.

2. The process which comprises preparing a mixture of epsilon-caprolactam, a brominating agent and a liquid reaction medium below the bromination temperature of the mixture, heating the mixture to the bromination temperature, maintaining such a temperature until bromination is effected and hydrolyzing the resulting product to form alpha-bromo-epsilon-caprolactam.

3. The process of claim 2 in which the mixture is prepared below 30° C. and the bromination reaction is effected above 30° C.

4. The process which comprises reacting epsilon-caprolactam with a brominating agent in a liquid reaction medium at a temperature above 30° C. and hydrolyzing the resulting product to produce alpha-bromo-epsilon-caprolactam.

5. The process of claim 4 in which the bromination temperature is 30–120° C.

6. The process which comprises preparing a mixture of epsilon-caprolactam, a brominating agent and a liquid reaction medium at a temperature of 0–30° C., raising the temperature to a brominating temperature of 40–55° C., maintaining such a temperature until the reaction is terminated, and hydrolyzing the resulting product to form alpha-bromo-epsilon-caprolactam.

7. The process which comprises contacting alpha-bromo-epsilon-caprolactam with a reactive iodide to produce alpha-iodo-epsilon-caprolactam.

References Cited in the file of this patent

FOREIGN PATENTS 748,542     Germany _____ Apr. 13, 1944

OTHER REFERENCES

Von Braun, Ber., vol. 63, pp. 502–07 (1930).